US011445513B2

(12) United States Patent
Matsumura et al.

(10) Patent No.: US 11,445,513 B2
(45) Date of Patent: Sep. 13, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 36 days.

(21) Appl. No.: 16/753,198

(22) PCT Filed: Oct. 6, 2017

(86) PCT No.: PCT/JP2017/036543
§ 371 (c)(1),
(2) Date: Apr. 2, 2020

(87) PCT Pub. No.: WO2019/069465
PCT Pub. Date: Apr. 11, 2019

(65) Prior Publication Data
US 2020/0245336 A1 Jul. 30, 2020

(51) Int. Cl.
*H04W 72/04* (2009.01)
*H04W 80/08* (2009.01)

(52) U.S. Cl.
CPC ..... *H04W 72/0493* (2013.01); *H04W 72/042* (2013.01); *H04W 72/0413* (2013.01); *H04W 80/08* (2013.01)

(58) Field of Classification Search
CPC ......... H04W 72/0493; H04W 72/0413; H04W 72/042; H04W 80/08
See application file for complete search history.

(56) References Cited

U.S. PATENT DOCUMENTS

| | | | | |
|---|---|---|---|---|
| 9,125,188 | B2* | 9/2015 | Tamaki | H04W 72/0413 |
| 9,860,897 | B2* | 1/2018 | Chen | H04L 5/0073 |
| 10,257,853 | B2* | 4/2019 | Yerramalli | H04W 74/0816 |
| 10,305,668 | B2* | 5/2019 | Yang | H04L 5/0055 |
| 10,440,698 | B2* | 10/2019 | Wang | H04L 5/0053 |
| 10,484,875 | B2* | 11/2019 | Chen | H04L 5/0048 |
| 10,616,737 | B2* | 4/2020 | Liu | H04L 5/0044 |
| 10,681,683 | B2* | 6/2020 | Kim | H04W 48/08 |
| 10,736,139 | B2* | 8/2020 | You | H04W 72/0413 |
| 10,743,339 | B2* | 8/2020 | Jung | H04W 72/0453 |
| 10,743,344 | B2* | 8/2020 | Noh | H04L 27/26 |
| 10,798,688 | B2* | 10/2020 | Baldemair | H04L 1/0073 |

(Continued)

OTHER PUBLICATIONS

International Search Report issued in Application No. PCT/JP2017/036543, dated Dec. 26, 2017 (3 pages).

(Continued)

*Primary Examiner* — Brian T O Connor
(74) *Attorney, Agent, or Firm* — Osha Bergman Watanabe & Burton LLP

(57) ABSTRACT

A user terminal according to the present invention includes: a transmitting section that transmits uplink control information (UCI) using an uplink control channel of a first duration and/or an uplink control channel of a second duration longer than the first duration; a receiving section that receives information related to fallback of the uplink control channel; and a control section that controls a format of the uplink control channel to be used to transmit the UCI, based on information related to the fallback.

4 Claims, 12 Drawing Sheets

(56) References Cited

U.S. PATENT DOCUMENTS

| | | | |
|---|---|---|---|
| 10,827,471 B2* | 11/2020 | Patel | H04L 5/0055 |
| 10,917,880 B2* | 2/2021 | Wang | H04W 74/0833 |
| 10,932,236 B2* | 2/2021 | Li | H04L 5/0057 |
| 2017/0289993 A1 | 10/2017 | Yerramalli et al. | |
| 2020/0187196 A1* | 6/2020 | Diachina | H04W 52/146 |

OTHER PUBLICATIONS

Written Opinion issued in International Application No. PCT/JP2017/036543, dated Dec. 26, 2017 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Extended European Search Report issued in counterpart European Patent Application No. 17927907.0, dated Apr. 8, 2021 (9 pages).
Samsung; "Resource Allocation for PUCCH with HARQ-ACK"; 3GPP TSG RAN WG1 Meeting #90, R1-1713631; Prague, Czechia, Aug. 21-25, 2017 (4 pages).
Samsung; "Resource Allocation for PUCCH transmission"; 3GPP TSG RAN WG1 Meeting 90bis, R1-1717655; Prague, CZ, Oct. 9-13, 2017 (4 pages).

\* cited by examiner

| PUCCH FORMAT | THE NUMBER OF SYMBOLS | THE NUMBER OF BITS |
|---|---|---|
| 0 | 1-2 | ≤2 |
| 1 | 4-14 | ≤2 |
| 2 | 1-2 | >2 |
| 3 | 4-14 | >2, <N |
| 4 | 4-14 | >2 |

| ITEM NAME | DESCRIPTION |
|---|---|
| ... | ... |
| PUCCH FORMAT INFORMATION | DESIGNATE ANY ONE OF PUCCH FORMAT 0 TO 4 |
| ... | ... |

FIG. 3B

| ITEM NAME | DESCRIPTION |
|---|---|
| ... | ... |
| PUCCH TYPE INFORMATION | DESIGNATE SHORT PUCCH OR LONG PUCCH |
| ... | ... |

FIG. 4A

| CERTAIN FIELD VALUE IN DCI | PARAMETER SET |
|---|---|
| 00 | PARAMETER SET 0-0 |
| 01 | PARAMETER SET 0-1 |
| 10 | PARAMETER SET 1-0 |
| 11 | PARAMETER SET 1-1 |

FIG. 4B

| CERTAIN FIELD VALUE IN DCI | PARAMETER SET |
|---|---|
| 00 | PARAMETER SET 2-0 |
| 01 | PARAMETER SET 2-1 |
| 10 | PARAMETER SET 3-0 |
| 11 | PARAMETER SET 3-1 |

| CERTAIN FIELD VALUE IN DCI | WITHOUT FALLBACK | WITH FALLBACK |
|---|---|---|
| 00 | PARAMETER SET A0 | PARAMETER SET B0 |
| 01 | PARAMETER SET A1 | PARAMETER SET B1 |
| 10 | PARAMETER SET A2 | PARAMETER SET B2 |
| 11 | PARAMETER SET A3 | PARAMETER SET B3 |

FIG. 5

| CERTAIN FIELD VALUE IN DCI | WITHOUT FALLBACK | WITH FALLBACK | ENABLE INFORMATION |
|---|---|---|---|
| 00 | PARAMETER SET A0 | PARAMETER SET B0 | WITHOUT FALLBACK |
| 01 | PARAMETER SET A0 | PARAMETER SET B0 | WITH FALLBACK |
| 10 | PARAMETER SET A1 | PARAMETER SET B1 | WITHOUT FALLBACK |
| 11 | PARAMETER SET A1 | PARAMETER SET B1 | WITH FALLBACK |

FIG. 6

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to Rel. 13), downlink (DL) and/or uplink (UL) communications are carried out using 1 ms subframes (referred to as, for example, "transmission time intervals (TTIs)"). This subframe is the unit of time to transmit one data packet that is channel-encoded, and is the processing unit in scheduling, link adaptation, retransmission control (HARQ (Hybrid Automatic Repeat reQuest), and so on.

In existing LTE systems (for example, LTE Rel. 8 to Rel. 13), a user terminal transmits uplink control information (UCI) by using a UL control channel (for example, PUCCH (Physical Uplink Control Channel)) or a UL data channel (for example, PUSCH (Physical Uplink Shared Channel)). A structure (format) of the UL control channel is referred to as a "PUCCH format," for example.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, LTE Rel. 14, Rel. 15, or later versions, 5G, NR, and so on), it is assumed to transmit UCI by using UL control channels with different configurations (formats) from those of existing LTE systems (for example, LTE Rel. 13 or earlier versions).

For example, for the future radio communication systems, a study is underway to support a UL control channel having a first duration (for example, one to two symbols) that is relatively short (also referred to as a short PUCCH and so on), and a UL control channel having a second duration (for example, 4 to 14 symbols) that is longer than the first duration (hereinafter also referred to as a long PUCCH and so on).

Additionally, for the future radio communication systems, a study is underway to support, for each of the short PUCCH and the long PUCCH, one or more formats (also referred to as a configuration, a PUCCH format (PF), or the like) having different numbers of bits of UCI that can be transmitted.

As described above, among a plurality of PUCCH formats having different durations and/or numbers of bits that can be transmitted, a coverage is assumed to be different. Accordingly, as a result that an appropriate PUCCH format is not applied to a user terminal (a Coverage limited UE) whose coverage is limited to a certain range, the quality of the UL control channel may deteriorate.

The present invention has been made in view of the above, and it is therefore an object of the present invention to provide a user terminal and a radio communication method capable of preventing deterioration in quality of a UL control channel when a plurality of PUCCH formats having different durations and/or numbers of bits that can be transmitted are supported.

Solution to Problem

An aspect of a user terminal according to the present invention includes: a transmitting section that transmits uplink control information (UCI) using an uplink control channel of a first duration and/or an uplink control channel of a second duration longer than the first duration; a receiving section that receives information related to fallback of the uplink control channel; and a control section that controls a format of the uplink control channel to be used to transmit the UCI, based on information related to the fallback.

Advantageous Effects of Invention

According to the present invention, it is possible to prevent deterioration in quality of a UL control channel when a plurality of PUCCH formats having different durations and/or numbers of bits that can be transmitted are supported.

BRIEF DESCRIPTION OF DRAWINGS

FIG. 2 is a diagram to show an example of PUCCH formats in the future radio communication system;

FIGS. 3A and 3B are diagrams to show examples of higher layer control information according to a second aspect;

FIGS. 4A and 4B are diagrams to show examples of first PUCCH resource allocation according to a third aspect;

FIG. 5 is a diagram to show an example of second PUCCH resource allocation according to the third aspect;

FIG. 6 is a diagram to show another example of second PUCCH resource allocation according to the third aspect;

DESCRIPTION OF EMBODIMENTS

For future radio communication systems (for example, LTE Rel. 15 or later versions, 5G, NR, and so on), a configuration (also referred to as a format, a PUCCH format (PF), or the like) for a UL control channel (for example, a PUCCH) used for transmission of UCI is under study.

Figure 1A:
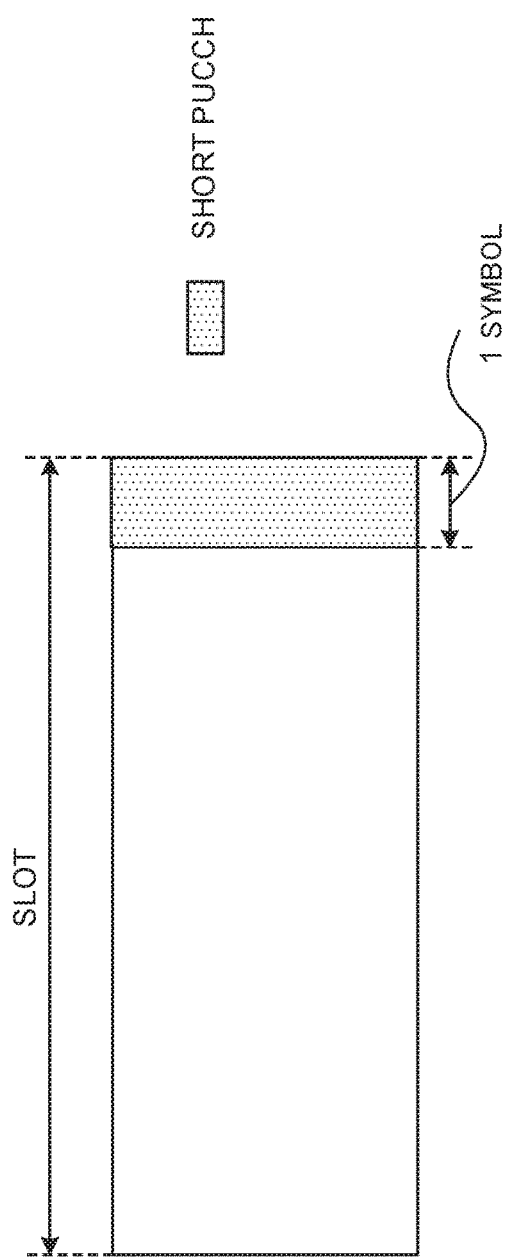
FIGS. 1A and 1B are diagrams to show configuration examples of UL control channels.
Figure 1B:
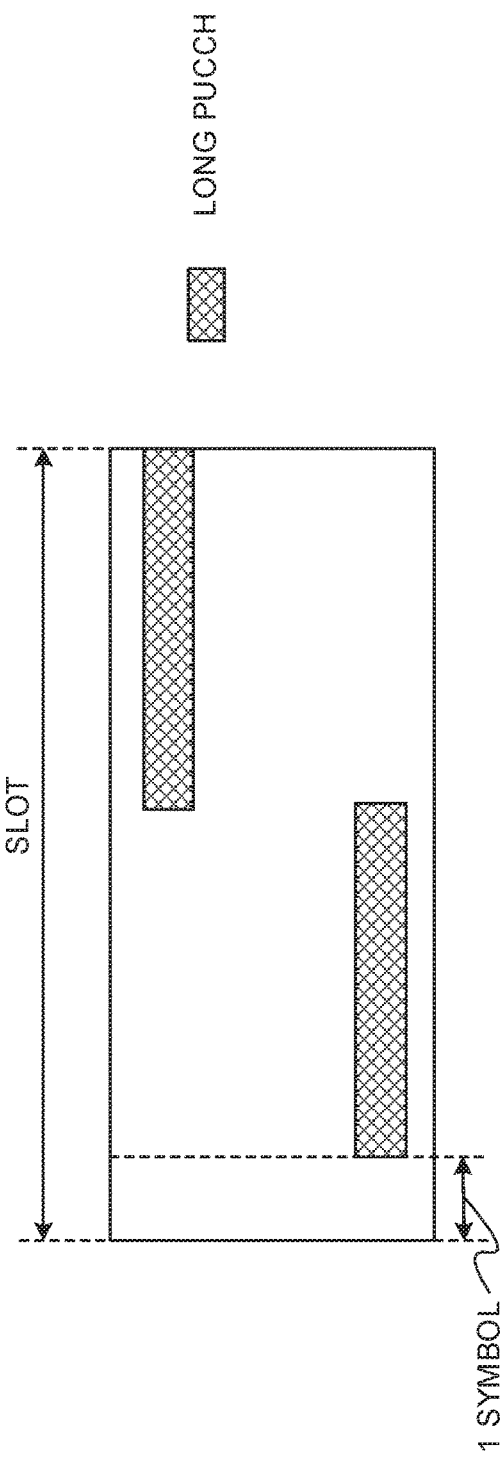

FIGS. 1A and 1B are diagrams to show examples of a PUCCH in a future radio communication system. FIG. 1A shows a PUCCH (a short PUCCH) constituted of a relatively small number of symbols (duration, for example, one to two symbols). FIG. 1B shows a PUCCH (a long PUCCH) constituted of a larger number of symbols (duration, for example, 4 to 14 symbols) than that of the short PUCCH.

As shown in FIG. 1A, the short PUCCH may be mapped to a certain number of symbols (for example, one to two symbols) from the end of a slot. Note that the symbols to which the short PUCCH is mapped are not limited to those at the end of the slot but may be the certain number of symbols at the start of or in the middle of the slot. The short PUCCH is mapped to one or more frequency resources (for example, one or more physical resource blocks (PRBs)). Note that it is assumed in FIG. 1A that the short PUCCH is mapped to consecutive PRBs, but the short PUCCH may be mapped to nonconsecutive PRBs.

The short PUCCH may be time-division-multiplexed and/or frequency-division-multiplexed with a UL data channel (hereinafter also referred to as a "PUCCH") in the slot. Furthermore, the short PUCCH may be time-division-multiplexed and/or frequency-division-multiplexed with a DL data channel (hereinafter also referred to as a "PDCCH") and/or a DL control channel (hereinafter also referred to as a "PDCCH (Physical Downlink Control Channel)") in the slot.

The short PUCCH may use a multi-carrier waveform (for example, an OFDM (Orthogonal Frequency Division Multiplexing) waveform) or may use a single-carrier waveform (for example, a DFT-s-OFDM (Discrete Fourier Transform-Spread-Orthogonal Frequency Division Multiplexing) waveform).

Meanwhile, as shown in FIG. 1B, the long PUCCH is mapped over a larger number of symbols (for example, 4 to 14 symbols) than that of the short PUCCH. In FIG. 1B, the long PUCCH is not mapped to a certain number of symbols at the starting of the slot but may be mapped to the certain number of symbols at the start.

As illustrated in FIG. 1B, to obtain a power boosting effect, the long PUCCH may be constituted of a smaller number of frequency resources (for example, one or two PRBs) than that of the short PUCCH or may be constituted of the equal number of frequency resources to that of the short PUCCH.

The long PUCCH may be frequency-division-multiplexed with a PUSCH in the slot. The long PUCCH may be time-division-multiplexed with a PDCCH in the slot. The long PUCCH may be mapped to the same slot as that of the short PUCCH. The long PUCCH may use a single-carrier waveform (for example, a DFT-s-OFDM waveform), or may use a multi-carrier waveform (for example, an OFDM waveform).

As shown in FIG. 1B, frequency hopping may be employed on the long PUCCH for each certain duration in the slot (for example, mini (sub) slot). The frequency hopping may be performed at a timing when the number of symbols to be transmitted before and after the frequency hopping is equal (for example, in a case of 14 symbols per slot, 7 symbols), or may be performed at a timing when the number of symbol before and after the frequency hopping is unequal (for example, in a case of 14 symbols per slot, 6 symbols in the first half and 8 symbols in the second half, and so on).

FIG. 2 is a diagram to show an example of PUCCH formats in the future radio communication system. FIG. 2 shows a plurality of PUCCH formats having various numbers of symbols and/or numbers of bits of UCI. Note that the PUCCH formats shown in FIG. 2 are merely examples, and the contents of PUCCH formats 0 to 4 are not limited to those shown in FIG. 2.

For example, in FIG. 2, PUCCH format 0 is a short PUCCH (for example, FIG. 1A) for UCI of up to 2 bits, and is also referred to as a sequence-based short PUCCH and so on. The short PUCCH conveys UCI of up to 2 bits (for example, HARQ-ACK and/or SR), using 1 or 2 symbols.

PUCCH format 1 is a long PUCCH (for example, FIG. 1B) for UCI of up to 2 bits. The long PUCCH conveys UCI of up to 2 bits, using 4 to 14 symbols. In PUCCH format 1, a plurality of user terminals may be code-division-multiplexed (CDM) within the same PRB, through time-domain block-wise spreading using cyclic shift (CS) and/or orthogonal cover code (OCC), for example.

PUCCH format 2 is a short PUCCH (for example, FIG. 1A) for UCI of more than 2 bits. The short PUCCH conveys UCI of more than 2 bits, using 1 or 2 symbols.

PUCCH format 3 is a long PUCCH (for example, FIG. 1B) for UCI of more than 2 bits, and a plurality of user terminals may be multiplexed within the same PRB. The long PUCCH conveys UCI of more than 2 bits and less than N bits (or up to N bits), using 4 to 14 symbols. In PUCCH format 3, a plurality of user terminals may be code-division-multiplexed within the same PRB, through time-domain block-wise spreading using CS and/or OCC. Alternatively, a plurality of user terminals may be multiplexed, using at least one of (frequency-domain) block-wise spreading before discrete Fourier transform (DFT), frequency division multiplexing (FDM), and comb-like subcarriers (Comb).

Note that the threshold N for the number of bits of UCI only needs to be an integer of more than 3 (or 3 or more). The threshold N may be defined in a specification, or may be configured by higher layer signaling (for example, at least one of RRC (Radio Resource Control) signaling, and broadcast information (for example, MIB (Master Information Block), system information (for example, SIB (System Information Block), RMSI (Remaining Minimum System Information), and so on))).

PUCCH format 4 is a long PUCCH (for example, FIG. 1B) for UCI of more than 2 bits, and a single user terminal is multiplexed within the same PRB. The long PUCCH conveys UCI of more than N bits (or N bits or more). PUCCH format 4 is different from PUCCH format 3 in that a plurality of user terminals are not multiplexed within the same PRB.

Incidentally, in PUCCH formats 0 to 4 described above, depending on the duration (the number of symbols) and/or the number of bits of UCI that can be transmitted, a range of coverage is assumed to be different. For example, since the long PUCCH (PF1/3/4) includes a larger number of symbols than that of the short PUCCH (PF0/2), the coverage of the long PUCCH is larger than the coverage of the short PUCCH.

It is also assumed that the short PUCCH (PF0) for UCI of up to 2 bits uses a DFT spread OFDM (DFT-s-OFDM (Discrete Fourier Transform-Spread-Orthogonal Frequency Division Multiplexing)) waveform of a low PAPR (Peak-to-Average Power Patio), and the short PUCCH (PF2) for UCI of more than 2 bits uses an OFDM waveform. In this case, in PF0/2 each of which is the short PUCCH as well, PF0 with smaller number of bits that can be transmitted has a larger coverage than the coverage of PF2.

Furthermore, it is assumed that, in the long PUCCH (PF1) for UCI of up to 2 bits, cyclic redundancy check (CRC (Cyclic Redundancy Code)) is not added to the UCI, and the CRC is added to the long PUCCH (PF3/4) for UCI of more than 2 bits. In this case, in PF1/3/4 each of which is the long PUCCH as well, PF1 with smaller number of bits that can be transmitted has a larger coverage than the coverages of PF3/4.

As described above, among a plurality of PUCCH formats having different durations and/or numbers of bits that can be transmitted, a coverage is assumed to be different. Accordingly, as a result that an appropriate PUCCH format is not applied to a user terminal (a Coverage limited UE) whose coverage is limited to a certain range, the quality of the UL control channel may deteriorate.

Accordingly, the inventors of the present invention have come up with the idea of controlling fallback of the PUCCH format based on information from a radio base station, which makes it possible to prevent deterioration in quality of the UL control channel when a plurality of PUCCH formats having different durations and/or numbers of bits that can be transmitted are supported.

The present embodiment will be described below in detail. In the present embodiment, a user terminal transmits uplink control information (UCI) using a short PUCCH (an uplink control channel of a first duration) and/or a long PUCCH (an uplink control channel of a second duration). The user terminal receives information related to fallback of the short PUCCH and/or the long PUCCH, and controls a PUCCH format (format) to be used for transmission of the UCI based on the information related to the fallback.

Here, "fallback" means that the user terminal switches a PUCCH format which is configured (or currently used) to another PUCCH format. The fallback may be performed between PUCCH formats having the same duration and different numbers of bits that can be transmitted (for example, fallback from PF2 to PF0, or fallback from PF3/4 to PF1). The fallback may be performed between PUCCH formats having different durations and the same number of bits that can be transmitted (for example, fallback from PF0 to PF1, or fallback from PF2 to PF3/4).

"Information related to fallback" may include, for example, command information (trigger information) for commanding (triggering) the fallback to the user terminal and/or configuration information related to the fallback. The information related to the fallback may be included in downlink control information (DCI) transmitted by a DL control channel (for example, PDCCH) and/or may be configured through higher layer signaling.

The above-described command information may be one-bit information for commanding whether or not to perform fallback (for example, 1: perform fallback, 0: not perform fallback). Furthermore, the configuration information may include, for example, at least one of information indicating one or more resources used by a PUCCH format of a fallback destination (resource information), information indicating a PUCCH format of a fallback destination (PUCCH format information), and information indicating a short PUCCH or a long PUCCH (PUCCH type information) and so on.

The "UCI" may include at least one of scheduling request (SR), re-transmission control information (HARQ-ACK (Hybrid Automatic Repeat reQuest-Acknowledge), ACK or NACK (Negative ACK)) for DL data (a DL data channel (for example, PDSCH (Physical Downlink Shared Channel))), channel state information (CSI), and information related to a beam.

Hereinafter, cases where PUCCH formats 0 to 4 shown in FIG. 2 are used are described as examples, but PUCCH formats which can be applied to fallback control of the present embodiment are not limited to those shown in FIG. 2, names and configurations thereof may be appropriately changed.

(First Aspect)

In a first aspect, fallback control based on a predetermined rule is described. A user terminal may determine, in a case of receiving command information for commanding fallback (for example, a one-bit value "1: perform fallback") from a radio base station, a PUCCH format of a fallback destination based on a predetermined rule. The command information may be included, for example, in DCI.

Here, the rule may be determined based on a duration and/or the number of bits that can be transmitted (that is, information indicating a coverage), and may include one or more rules. For example, the rule may be determined in the order of PUCCH format 2, PUCCH format 0, and PUCCH format 1, and/or may be determined in the order of PUCCH format 3/4 and PUCCH format 1.

The user terminal may be assumed, in a case of receiving the above-described command information from the radio base station, to perform fallback on one configured PUCCH format. For example, in a case where PUCCH format 0 is configured to the user terminal, the user terminal may perform fallback to PUCCH format 1 in accordance with the above-described rule.

In the first aspect, since the fallback of the PUCCH format is controlled in accordance with a predetermined rule, it is sufficient for the radio base station to command only the fallback, and it is thus possible to reduce overhead associated with determination of the PUCCH format of a fallback destination.

(Second Aspect)

In a second aspect, fallback control based on control information signaled through higher layer signaling (higher layer control information) is described. A user terminal may determine, in a case of receiving command information for commanding fallback (for example, a one-bit value "1: perform fallback") from a radio base station, a PUCCH format of a fallback destination based on the higher layer control information.

Here, the higher layer control information may be, for example, at least one of broadcast information (MIB), system information (SIB and/or RMSI), control information signaled through RRC signaling, and a MAC control element (MAC CE (Medium Access Control Control Element)). The higher layer control information may be common to one or more user terminals, or may be cell-specific. FIGS. 3A and 3B are diagrams to show examples of higher layer control information according to the second aspect.

<First Fallback Control>

As shown in FIG. 3A, the above-described higher layer control information may include information indicating a PUCCH format of a fallback destination (PUCCH format information). For example, in FIG. 3A, the PUCCH format information designates any one of PUCCH formats 0 to 4.

As shown in FIG. 3A, when the higher layer control information includes the PUCCH format information, the user terminal may perform, in response to reception of command information for commanding fallback from the radio base station, fallback to a PUCCH format designated by the PUCCH format information.

<Second Fallback Control>

Alternatively, as shown in FIG. 3B, the above-described higher layer control information may include information indicating a PUCCH type of a fallback destination (PUCCH type information). For example, in FIG. 3B, the PUCCH type information designates a short PUCCH (FIG. 1A) or a long PUCCH (FIG. 1B). Note that it is sufficient that the PUCCH type information is information for designating the short PUCCH or the long PUCCH, and the information may be, for example, the number of symbols constituting the PUCCH or the like.

As shown in FIG. 3B, when the higher layer control information includes the PUCCH type information, the user terminal may determine, in response to reception of command information for commanding fallback from the radio base station, a PUCCH format of a fallback destination based on the PUCCH type information.

«Case where Short PUCCH is Designated»

In a case where the PUCCH type information (for example, FIG. 3B) designates a short PUCCH, the user terminal may determine a PUCCH format of a fallback destination based on a currently configured PUCCH format.

For example, in a case where the user terminal in which PUCCH format 2 is configured receives the command information for commanding fallback from the radio base station, fallback to PUCCH format 0 may be performed. In this case, although the PUCCH classifications (short PUCCH) are the same before and after the fallback, the bits that can be transmitted is reduced.

Accordingly, the user terminal may control, based on the number of bits of UCI that can be transmitted by the PUCCH format of the fallback destination and a type and/or the number of bits of UCI to be transmitted, selection of UCI to be transmitted (for example, a certain number of HARQ-ACKs) and/or drop of at least part of the UCI (for example, CSI and/or SR).

Here, the type of the UCI indicates at least one of the HARQ-ACK, the SR, and the CSI, may be referred to as a kind or the contents or the like of UCI. Note that the CSI may be rephrased as at least one of channel state information (CQI (Channel Quality Indicator)), a rank indicator (RI), and a precoding matrix indicator (PMI).

For example, (1) in a case where the user terminal performs fallback to PUCCH format 0 and where UCI to be transmitted includes HARQ-ACK of up to 2 bits, the HARQ-ACK of up to 2 bits may be transmitted by PUCCH format 0, and the other UCI (for example, CSI and/or SR) may be dropped.

(2) In a case where the user terminal performs fallback to PUCCH format 0 and where UCI to be transmitted includes HARQ-ACK of more than 2 bits, a certain number (for example, two) of HARQ-ACKs to be transmitted by PUCCH format 0 described above may be selected, and the other UCI (for example, CSI and/or SR) may be dropped.

The certain number of HARQ-ACKs may be selected based on an identifier of a cell (a cell ID) with which DL data corresponding to the HARQ-ACK are transmitted. For example, the certain number of HARQ-ACKs with the maximum or minimum cell ID may be selected.

The certain number of HARQ-ACKs may be selected based on an index (TB index) of a transport block (TB) of the DL data corresponding to the HARQ-ACK. For example, the certain number of HARQ-ACKs with the maximum or minimum TB index may be selected. In this case, the HARQ-ACK may be generated in a TB unit.

The certain number of HARQ-ACKs may be selected based on an index (CC index) of a component carrier (CC) with which the DL data corresponding to the HARQ-ACK are transmitted. For example, the certain number of HARQ-ACKs with the maximum or minimum CC index may be selected.

The certain number of HARQ-ACKs may be selected based on an index (CBG index) of a code block group (CBG) of the DL data corresponding to the HARQ-ACK. For example, the certain number of HARQ-ACKs with the maximum or minimum CBG index may be selected. The CBG includes one or more CBs, and the TB includes one or more CBGs. In this case, the HARQ-ACK may be generated in a CBG unit.

As described above, based on at least one of the cell ID, the TB index, the CC index, and the CBG index, the user terminal may select UCI (for example, the certain number of HARQ-ACKs) to be transmitted by the PUCCH format of the fallback destination and may drop the other UCI (for example, CSI).

(3) In a case where the user terminal performs fallback to PUCCH format 0 and where UCI to be transmitted includes HARQ-ACK of more than 2 bits, a certain number of HARQ-ACKs may be bundled into up to 2 bits, and the other UCI (for example, CSI and/or SR) may be dropped.

The certain number of HARQ-ACKs to be bundled may be at least one of a certain number of HARQ-ACKs of DL slot, a certain number of HARQ-ACKs of codeword (CW) (spatial bundling), a certain number of HARQ-ACKs of CBG, and a certain number of HARQ-ACKs of CC.

(4) In a case where the user terminal performs fallback to PUCCH format 0 and where UCI to be transmitted includes HARQ-ACK of more than 2 bits, HARQ-ACK of 3 bits may be transmitted, and the other UCI (for example, CSI and/or SR) may be dropped. The HARQ-ACK of 3 bits may be selected based on at least one of the cell ID, the TB index, the CC index, and the CBG index, and/or a certain number of HARQ-ACKs may be bundled.

«Case where Long PUCCH is Designated»

In a case where the PUCCH type information (for example, FIG. 3B) designates a long PUCCH, the user terminal may determine a PUCCH format of a fallback destination based on a currently configured PUCCH format. Specifically, the user terminal may determine a PUCCH format of a fallback destination based on the number of bits of UCI that can be transmitted by a currently configured PUCCH format.

For example, in a case where the user terminal in which PUCCH format 0 of the short PUCCH is configured receives the command information for commanding fallback from the radio base station, fallback, to PUCCH format 1, of the long PUCCH which can transmit the same number of bits as that of PUCCH format 0 described above may be performed.

In a case where the user terminal in which PUCCH format 2 of the short PUCCH is configured receives the command information for commanding fallback from the radio base station, fallback to PUCCH format 3 or 4 (3/4) of the long PUCCH which can transmit the same number of bits as that of PUCCH format 2 described above may be performed.

In a case of fallback from PUCCH format 2 to PUCCH format 3/4, the higher layer control information in FIG. 3B may include information indicating a PUCCH format of a fallback destination (here, one of PUCCH format 3 and 4), in addition the PUCCH type information. Alternatively, whether to perform fallback to PUCCH format 3 or 4 may be defined in a specification.

In PUCCH format 3 as described above, since a plurality of user terminals are multiplexed within the same PRB, performing fallback to PUCCH format 3 can improve utilization efficiency of radio resources. On the other hand, in PUCCH format 4, since a plurality of user terminals are not multiplexed within the same PRB, performing fallback to PUCCH format 4 can improve reception quality of UCI in the radio base station.

In a case where the user terminal in which PUCCH format 3 or 4 is configured receives the command information from the radio base station, fallback to PUCCH format 1 may be performed. In this case, although the PUCCH classifications (long PUCCH) are the same before and after the fallback, the number of bits that can be transmitted decreases.

Accordingly, the user terminal may control, based on the number of bits of UCI that can be transmitted by the PUCCH format of the fallback destination and a type and/or the number of bits of UCI to be transmitted, selection of UCI to be transmitted (for example, a certain number of HARQ-ACKs) and/or drop of at least part of the UCI (for example, CSI and/or SR).

Specifically, based on at least one of the cell ID, the TB index, the CC index, and the CBG index, the user terminal may select UCI (for example, the certain number of HARQ-ACKs) to be transmitted by PUCCH format 1 of the fallback destination and may drop the other UCI (for example, CSI and/or SR). Note that details of the selection and drop are the same as those in fallback from PUCCH format 2 to PUCCH format 0.

The user terminal may bundle a certain number of HARQ-ACKs into up to 2 bits, and may drop the other UCI (for example, CSI and/or SR). Note that details of the bundling and drop are the same as those in fallback from PUCCH format 2 to PUCCH format 0.

In the second aspect, based on the higher layer control information, the user terminal can appropriately determine a PUCCH format of a fallback destination, and can appropriately control transmission of UCI in the PUCCH format.

(Third Aspect)

In a third aspect, PUCCH resource allocation will be described in a case where fallback of the PUCCH format is performed as described in the first aspect or the second aspect.

<First PUCCH Resource Allocation>

In first PUCCH resource allocation, one or more parameter sets indicating a PUCCH resource for each PUCCH format may be configured through higher layer signaling, and one of the parameter sets may be designated by DCI.

Here, each parameter set includes one or more parameters. For example, each parameter set may include information (parameter) indicating at least one of a PUCCH format, an PRB index in a certain band (for example, a start index of a PRB allocated to the PUCCH in a BWP (Bandwidth Part) of UL), the number of PRBs, a symbol index in a slot (for example, an index of a first symbol allocated to the PUCCH in a slot), a duration in a slot (the number of symbols, or an index of a last symbol allocated to the PUCCH in a slot), a code index (for example, a CS value and/or an index of OCC), and a sequence index.

Each parameter set may include a different and/or the same parameter for each PUCCH format. Each parameter set may include a different and/or the same parameter for each type of UCI.

FIGS. 4A and 4B are diagrams to show examples of the first PUCCH resource allocation according to the third aspect. In FIG. 4A, each value of a certain field in DCI is associated with a parameter set indicating a PUCCH resource for PUCCH format 0 for UCI of up to 2 bits. For example, FIGS. 4A and 4B show parameter sets 0-0 and 0-1 for PUCCH format 0 and parameter sets 1-0 and 1-1 for PUCCH format 1.

On the other hand, in FIG. 4B, each value of a certain field in DCI is associated with a parameter set indicating a PUCCH resource for PUCCH format 2/3/4 for UCI of more than 2 bits. For example, FIG. 4B shows parameter sets 2-0 and 2-1 for PUCCH format 2 and parameter sets 3-0 and 3-1 for PUCCH format 3.

In FIGS. 4A and 4B, the parameter set associated with the values of the certain field of the DCI is configured to the user terminal through higher layer signaling. For example, in a case of receiving DCI including command information for commanding fallback (for example, a one-bit value "1: perform fallback"), with reference to the table shown in FIG. 4A or FIG. 4B, the user terminal may specify a PUCCH resource based on a parameter set associated with a value in a certain field of the DCI.

Note that two different tables are shown in accordance with the number of bits of the UCI in FIGS. 4A and 4B, but the configuration is not limited thereto, a single table may be used. In each table, one or more parameter sets indicating PUCCH resources of one or more PUCCH formats may be designated.

<Second PUCCH Resource Allocation>

In second PUCCH resource allocation, one or more parameter sets indicating a PUCCH resource in a case without fallback and one or more parameter sets indicating a PUCCH resource in a case with fallback may be configured through higher layer signaling, and one of the parameter sets may be designated by DCI.

One or more parameters included in each parameter set are as described in the first PUCCH resource allocation. The following description will be given focusing on differences from the first PUCCH resource allocation.

FIG. 5 is a diagram to show an example of the second PUCCH resource allocation according to the third aspect. As illustrated in FIG. 5, each value in a certain field in DCI may be associated with both one or more parameter sets indicating a PUCCH resource in a case without fallback and one or more parameter sets indicating a PUCCH resource in a case with fallback.

In FIG. 5, each value of parameter sets A0 to A3 in a case without fallback and parameter sets B0 to B3 in a case with fallback is configured to the user terminal through higher layer signaling.

For example, in a case of receiving DCI including command information for commanding fallback (for example, a one-bit value "1: perform fallback"), with reference to the table shown in FIG. 5, the user terminal may specify a PUCCH resource based on the parameter set with fallback (any one of B0 to B3) associated with a value in a certain field of the DCI.

On the other hand, in a case where fallback is not commanded (for example, DCI including a one-bit value "0: not perform fallback" is received), with reference to the table shown in FIG. 6, the user terminal may specify a PUCCH resource based on the parameter set without fallback (any one of A0 to A3) associated with a certain field value of the DCI.

In the case shown FIG. 5, a value in a single field in DCI can indicate different PUCCH resources between a case without fallback and a case with fallback.

FIG. 6 is a diagram to show another example of the second PUCCH resource allocation according to the third aspect. As illustrated in FIG. 6, each value in a certain field in DCI may be associated with one or more parameter sets indicating a PUCCH resource in a case without fallback, one or more parameter sets indicating a PUCCH resource in a case with fallback, and information indicating which one of cases with and without fallback is to be enabled (enable information).

In FIG. 6, each value of the parameter sets A0 to A3 in a case without fallback and the parameter sets B0 to B3 in a case with fallback and the enable information are configured to the user terminal through higher layer signaling.

For example, in a case of receiving DCI including a certain field value "01," in the table shown in FIG. 6, since the enable information associated with the certain field value "01" indicates "with fallback," the user terminal may specify a PUCCH resource based on the parameter set B0 with fallback.

On the other hand, in a case of receiving DCI including a certain field value "00," since the enable information associated with the certain field value "00" indicates "without fallback," the user terminal may specify a PUCCH resource based on the parameter set A0 without fallback.

In a case shown FIG. 6, a value in a single field in DCI can indicate different PUCCH resources between a case without fallback and a case with fallback, and as the command information for commanding fallback, the single field value can also be used.

(Radio Communication System)

Hereinafter, a structure of a radio communication system according to the present embodiment will be described. In this radio communication system, the radio communication methods according to the above-described aspects are employed. Note that the radio communication methods according to the above-described aspects may be employed independently or may be employed by combining at least two of the radio communication methods.

Figure 7:
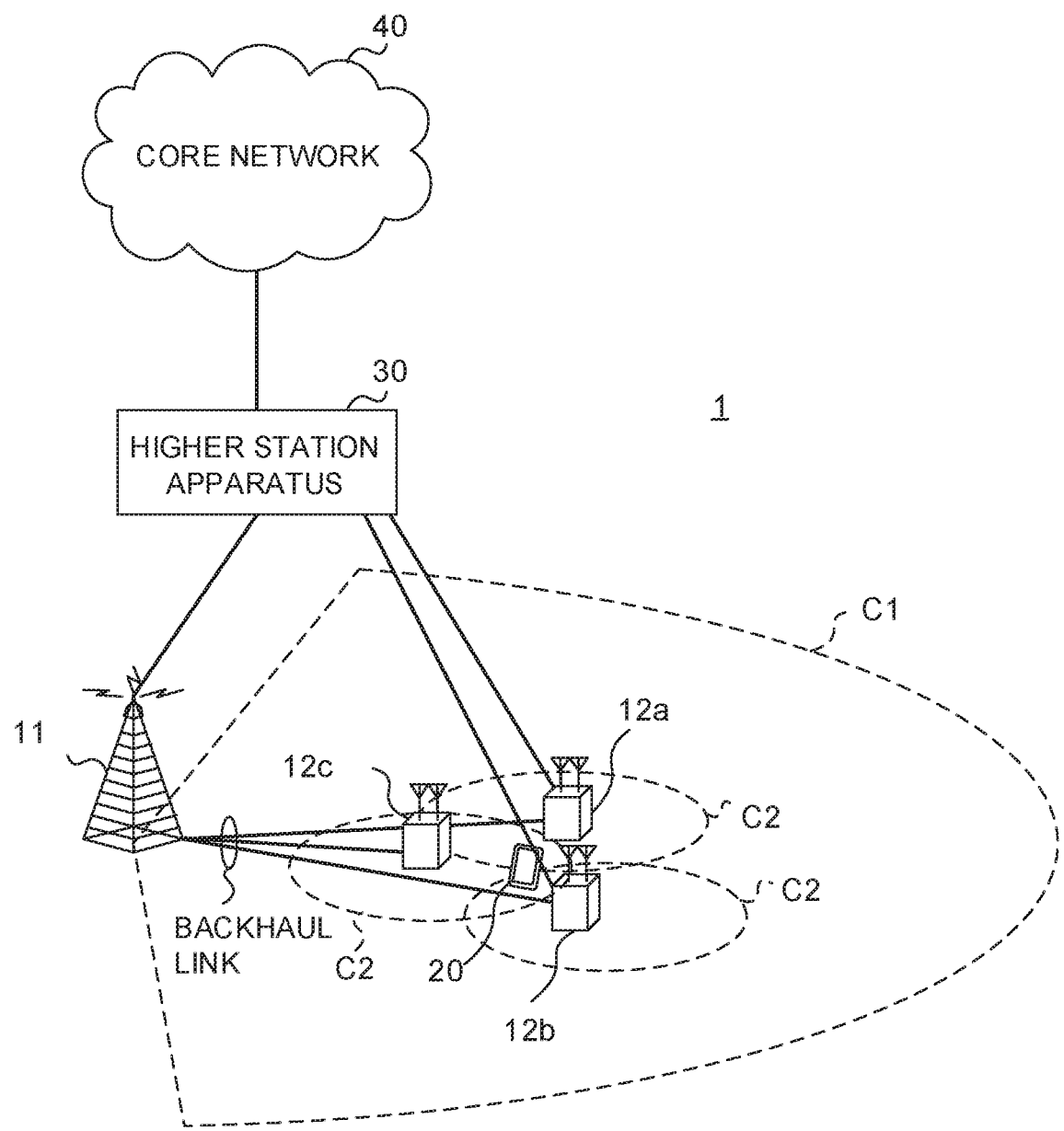
FIG. 7 is a diagram to show an example of a schematic structure of a radio communication system according to the present embodiment.

FIG. 7 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 7 is provided with a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells and/or within a cell may be adopted.

Here, "numerology" refers to communication parameters in the frequency direction and/or the time direction (for example, at least one of the subcarrier spacing (subcarrier interval), the bandwidth, the symbol length, the time length of CPs (CP length), the subframe length, the time length of TTIs (TTI length), the number of symbols per TTI, the radio frame structure, the filtering process, the windowing process, and so on). The radio communication system 1 may support subcarrier spacings of 15 kHz, 30 kHz, 60 kHz, 120 kHz, 240 kHz, and so on, for example.

The user terminals 20 can connect with both the radio base station 11 and the radio base stations 12. The user terminals 20 may use the macro cell C1 and the small cells C2, which use different frequencies, at the same time by means of CA or DC. Also, the user terminals 20 can execute CA or DC by using a plurality of cells (CCs) (for example, two or more CCs). Furthermore, the user terminals can use licensed band CCs and unlicensed band CCs as a plurality of cells.

Furthermore, the user terminal 20 can perform communication using time division duplex (TDD) or frequency division duplex (FDD) in each cell. A TDD cell and an FDD cell may be referred to as a "TDD carrier (frame structure type 2)" and an "FDD carrier (frame structure type 1)," respectively, for example.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," a "legacy carrier," and so on). Meanwhile, between the user terminals 20 and the radio base stations 12, a carrier of a relatively high frequency band (for example, 3.5 GHz, 5 GHz, 30 to 70 GHz, and so on) and a wide bandwidth may be used, or the same carrier as that used with the radio base station 11 may be used. Note that the structure of the frequency band for use in each radio base station is by no means limited to these.

A structure may be employed in which wired connection (for example, an optical fiber in compliance with the CPRI (Common Public Radio Interface), an X2 interface, and so on) or wireless connection is established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)," and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points," and so on. Hereinafter, the radio base stations 11 and 12 will be collectively referred to as "radio base stations 10," unless specified otherwise.

The user terminals 20 are terminals to support various communication schemes such as LTE, LTE-A, 5G, NR, and so on, and may include not only mobile communication terminals but also stationary communication terminals. Furthermore, the user terminals 20 can perform device-to-device (D2D) communication with other user terminals 20.

In the radio communication system 1, as radio access schemes, OFDMA (Orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Furthermore, in the radio communication system 1, a multi-carrier waveform (for example, an OFDM waveform) may be used, or a single-carrier waveform (for example, a DFT-s-OFDM waveform) may be used.

In the radio communication system 1, a DL shared channel (PDSCH (Physical Downlink Shared Channel), which is also referred to as a "DL data channel" and so on), which is used by each user terminal 20 on a shared basis, a broadcast channel (PBCH (Physical Broadcast Channel)), L1/L2 control channels, and so on, are used as DL channels. User data, higher layer control information, SIBs (System Information Blocks), and so on are communicated in the PDSCH. Also, MIBs (Master Information Blocks) are communicated in the PBCH.

The L1/L2 control channels include DL control channels (a PDCCH (Physical Downlink Control Channel) and an EPDCCH (Enhanced Physical Downlink Control Channel)), a PCFICH (Physical Control Format Indicator Channel), a PHICH (Physical Hybrid-ARQ Indicator Channel), and so on. Downlink control information (DCI) including PDSCH and PUSCH scheduling information is communicated in the PDCCH, for example. The number of OFDM symbols to use for the PDCCH is communicated in the PCFICH. The EPDCCH is frequency-division-multiplexed with the PDSCH and used to communicate DCI and so on, like the PDCCH. HARQ retransmission control information (ACK/NACK) in response to the PUSCH can be communicated in at least one of the PHICH, the PDCCH, and the EPDCCH.

In the radio communication system 1, a UL shared channel (PUSCH (Physical Uplink Shared Channel, also referred to as a "UL data channel" and so on)), which is used by each user terminal 20 on a shared basis, a UL control channel (PUCCH (Physical Uplink Control Channel)), a random access channel (PRACH (Physical Random Access Channel)), and so on are used as UL channels. User data and higher layer control information are communicated in the PUSCH. Uplink control information (UCI) including at least one of DL signal retransmission control information (A/N), channel state information (CSI), and so on, is communicated in the PUSCH or the PUCCH. By means of the PRACH, random access preambles for establishing connections with cells can be communicated.

<Radio Base Station>

Figure 8:
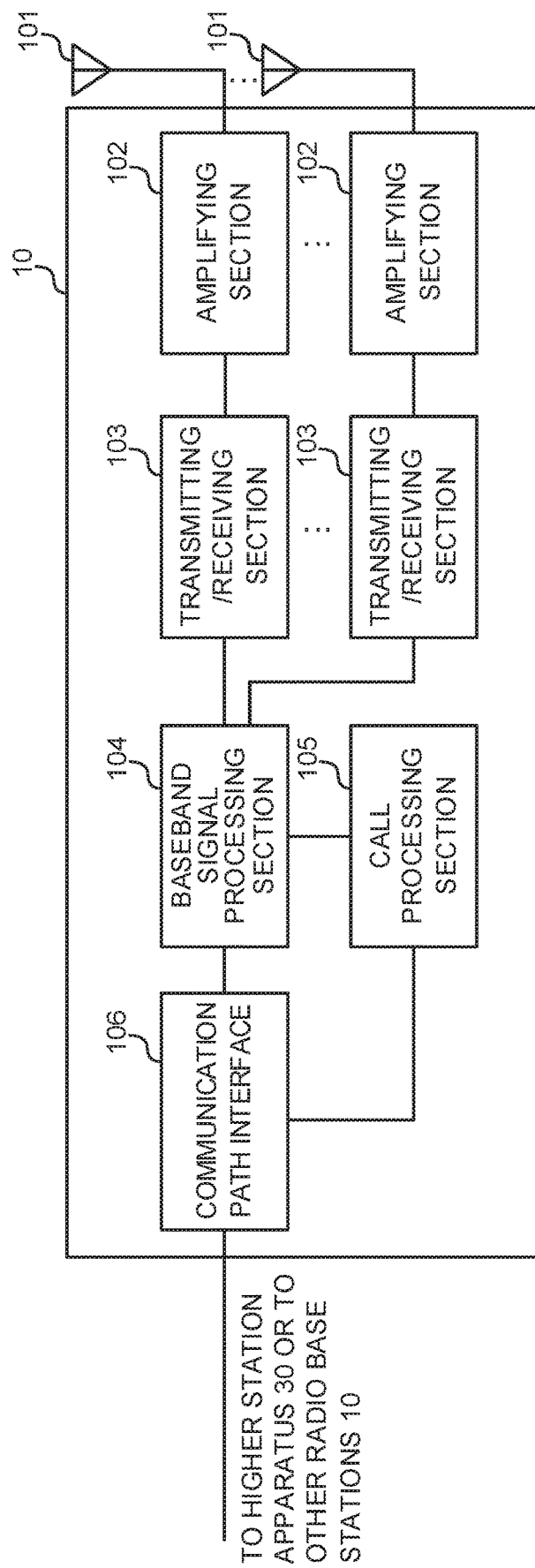
FIG. 8 is a diagram to show an example of an overall structure of the radio base station according to the present embodiment.

FIG. 8 is a diagram to show an example of an overall structure of the radio base station according to the present embodiment. A radio base station 10 is provided with a plurality of transmitting/receiving antennas 101, amplifying sections 102, transmitting/receiving sections 103, a baseband signal processing section 104, a call processing section 105, and a communication path interface 106. Note that the radio base station 10 may be configured to include one or more transmitting/receiving antennas 101, one or more amplifying sections 102, and one or more transmitting/receiving sections 103.

User data to be transmitted from the radio base station 10 to a user terminal 20 on the DL is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted with transmitters/receivers, transmitting/receiving circuits, or pieces of transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 converts the received signals into the baseband signal through frequency conversion and outputs to the baseband signal processing section 104.

In the baseband signal processing section 104, UL data that is included in the input UL signals is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing, such as setting up and releasing communication channels, manages the state of the radio base station 10, and manages the radio resources.

The communication path interface 106 transmits and/or receives signals to and/or from the higher station apparatus 30 via a certain interface. Also, the communication path interface 106 may transmit and/or receive signals (backhaul signaling) with neighboring radio base stations 10 via an inter-base station interface (for example, an optical fiber in compliance with the CPRI (Common Public Radio Interface) and an X2 interface).

Also, the transmitting/receiving sections 103 transmit DL signals (including at least one of DL data signals, DL control signals, and DL reference signals) to the user terminals 20, and receive UL signals (including at least one of UL data signals, UL control signals, and UL reference signals) from the user terminals 20.

Furthermore, the transmitting/receiving sections 103 receive UCI from the user terminal 20 using a UL data channel (for example, PUSCH) or a UL control channel (for example, a short PUCCH and/or a long PUCCH). The UCI may include at least one of HARQ-ACK of a DL data channel (for example, PDSCH), CSI, SR, beam identification information (for example, a beam index (BI)), and a buffer status report (BSR).

Furthermore, the transmitting/receiving sections 103 may transmit, through physical layer signaling (L1 signaling) and/or higher layer signaling, control information related to the UL control channel (for example, a short PUCCH, a long PUCCH) (for example, at least one of a format, the number of PUCCH units in a slot, a size of PUCCH unit, a multiplexing method of RS, a mapping position of RS, the presence or absence of RS, RS density, the presence or absence of SRS, a resource for UL control channel).

Furthermore, the transmitting/receiving sections 103 may transmit information related to fallback (for example, the above-described command information and/or configuration information).

Figure 9:
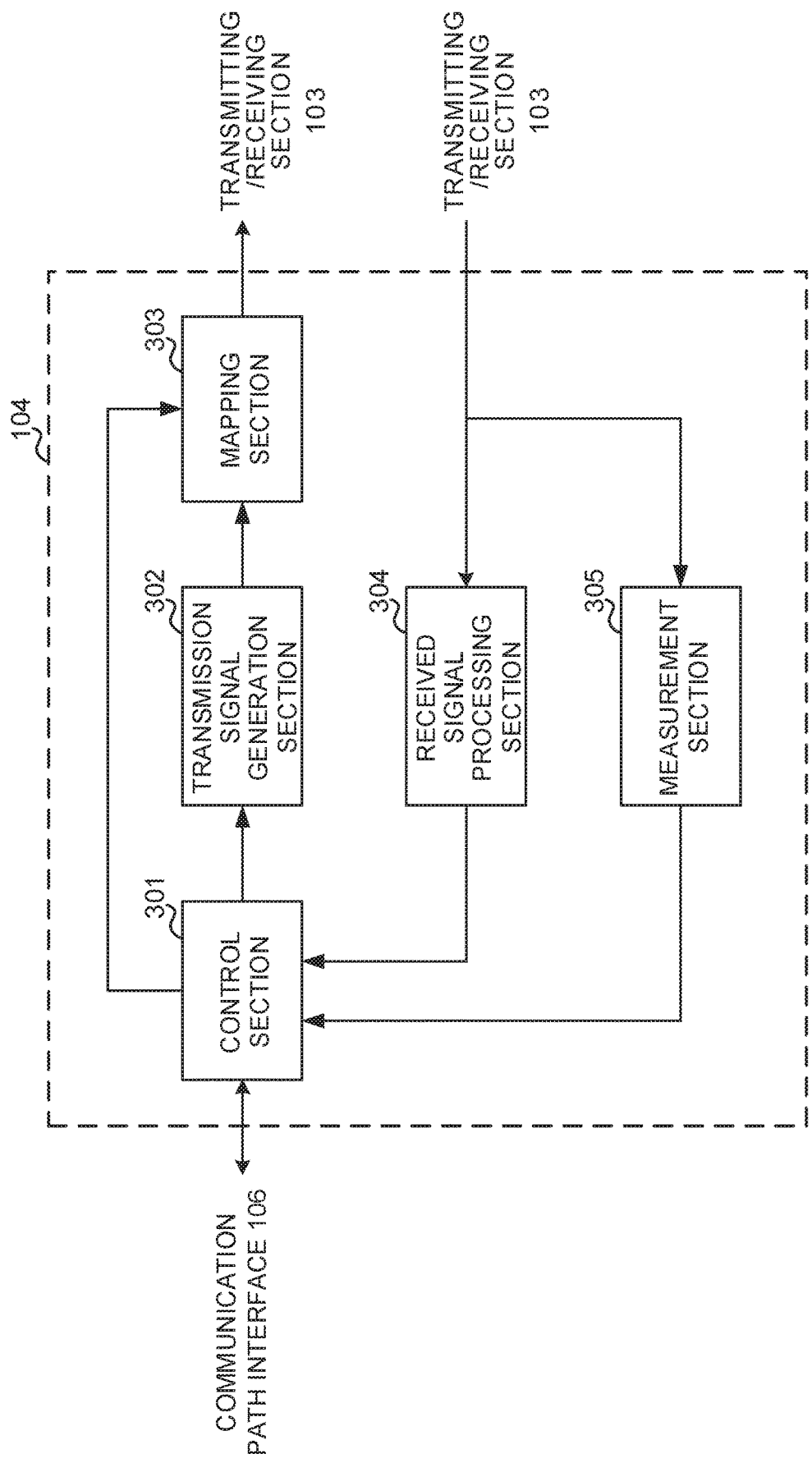
FIG. 9 is a diagram to show an example of a functional structure of a radio base station according to the present embodiment.

FIG. 9 is a diagram to show an example of a functional structure of a radio base station according to the present embodiment. Note that, although FIG. 9 primarily shows functional blocks that pertain to characteristic parts of the present embodiment, the radio base station 10 includes other functional blocks that are necessary for radio communication as well. As shown in FIG. 9, the baseband signal processing section 104 is provided with a control section 301, a transmission signal generation section 302, a mapping section 303, a received signal processing section 304, and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304, and the measurements by the measurement section 305.

To be more specific, the control section 301 performs scheduling for the user terminals 20. Specifically, the control section 301 may perform scheduling and/or retransmission control of the DL data channel and/or UL data channel, based on UCI (for example, CSI and/or BI) from the user terminals 20.

Furthermore, the control section 301 may control a structure (format) of an UL control channel (for example, a long PUCCH and/or a short PUCCH) and perform control to transmit control information related to the UL control channel.

Furthermore, the control section 301 may control fallback of a UL control channel (for example, a long PUCCH and/or a short PUCCH), and may control generation and/or transmission of information related to the fallback.

Also, the control section 301 may control a PUCCH resource.

The control section 301 may control the received signal processing section 304 to perform a receiving process of UCI from the user terminals 20, based on the UL control channel format.

The control section 301 can be constituted with a controller, a control circuit, or control apparatus that can be described based on general understanding of the technical field to which the present invention pertains.

The transmission signal generation section 302 generates DL signals (including DL data signals, DL control signals, and DL reference signals), based on commands from the control section 301 and outputs the DL signals to the mapping section 303.

The transmission signal generation section 302 may be a signal generator, a signal generation circuit, or signal generation apparatus that can be described based on general understanding of the technical field to which the present invention pertains.

The mapping section 303 maps the DL signals generated in the transmission signal generation section 302 to certain radio resources, based on commands from the control section 301, and outputs these to the transmitting/receiving sections 103. The mapping section 303 may be a mapper, a mapping circuit, or mapping apparatus that can be described based on general understanding of the technical field to which the present invention pertains.

The received signal processing section 304 performs the receiving process (for example, demapping, demodulation, decoding, and so on) of UL signals (including, for example, UL data signals, UL control signals, and UL reference signals) that are transmitted from the user terminals 20. Specifically, the received signal processing section 304 may output the received signals, the signals after the receiving process, and so on, to the measurement section 305. Furthermore, the received signal processing section 304 performs the receiving process of UCI, based on the UL control channel structures according to commands from the control section 301.

The measurement section 305 conducts measurements with respect to the received signals. The measurement section 305 can be constituted with a measurer, a measurement circuit, or measurement apparatus that can be described based on general understanding of the technical field to which the present invention pertains.

The measurement section 305 may measure the channel quality in UL, based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 10:
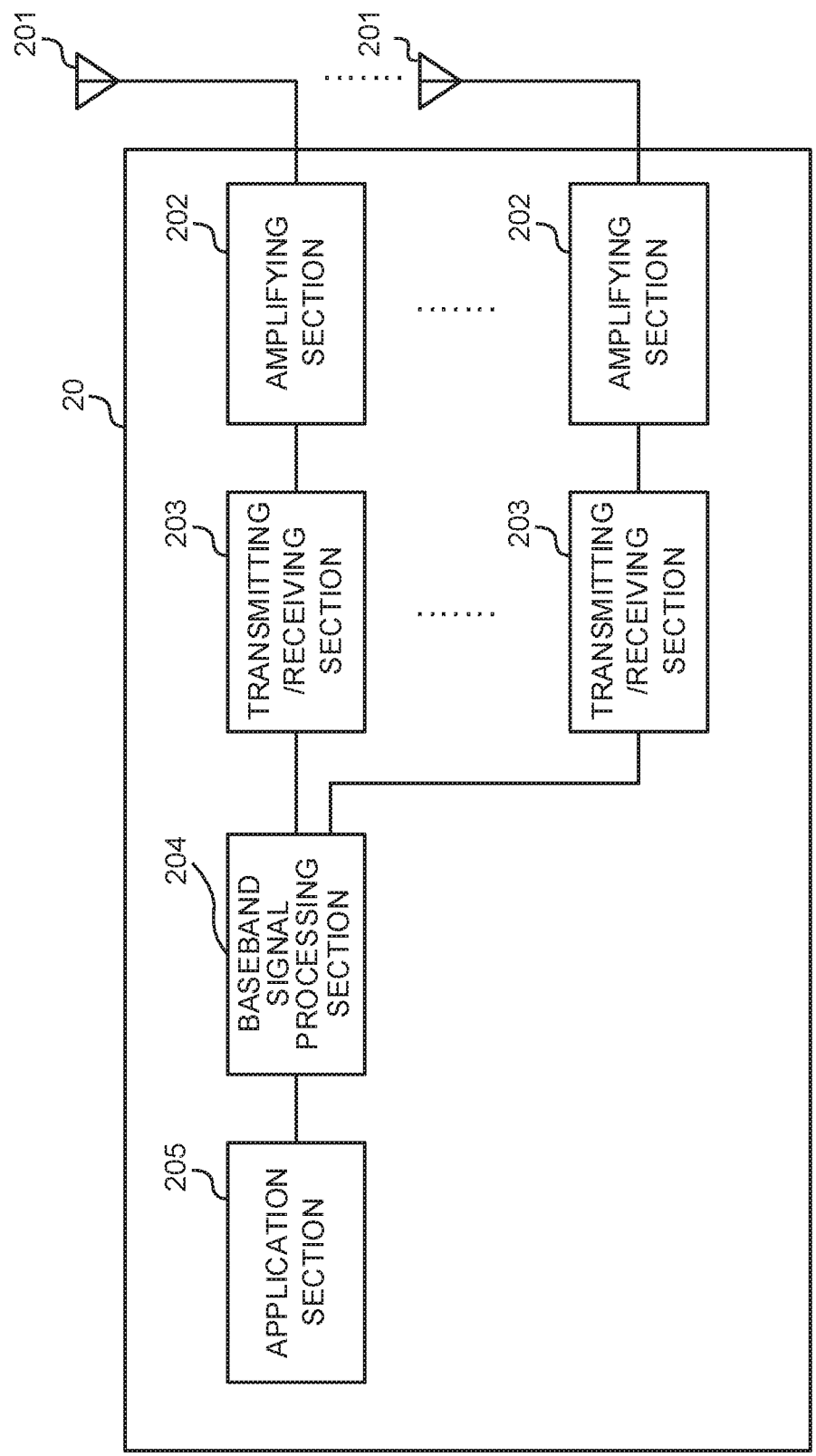
FIG. 10 is a diagram to show an example of an overall structure of a user terminal according to the present embodiment.

FIG. 10 is a diagram to show an example of an overall structure of a user terminal according to the present embodiment. Each user terminal 20 is provided with a plurality of transmitting/receiving antennas 201 for MIMO communication, amplifying sections 202, transmitting/receiving sections 203, a baseband signal processing section 204, and an application section 205.

Radio frequency signals that are received in the plurality of transmitting/receiving antennas 201 are amplified in the amplifying sections 202. The transmitting/receiving sections 203 receive DL signals amplified in the amplifying sections 202. The transmitting/receiving sections 203 convert the received signals into baseband signals through frequency conversion, and output the baseband signals to the baseband signal processing section 204.

The baseband signal processing section 204 performs, on each input baseband signal, an FFT process, error correction decoding, a retransmission control receiving process, and so on. The DL data is forwarded to the application section 205. The application section 205 performs processes related to higher layers above the physical layer and the MAC layer, and so on. Broadcast information is also forwarded to the application section 205.

Meanwhile, the uplink (UL) data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process, and so on, and the result is forwarded to each transmitting/receiving section 203. On UCI, at least one of channel coding, rate matching, puncturing, a DFT process, and an IFFT process is performed, and the result is transferred to each transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals, DL control signals, and DL reference signals) of the numerology configured in the user terminals 20, and transmit the UL signals (including UL data signals, UL control signals, and UL reference signals) of the numerology.

Furthermore, the transmitting/receiving sections 203 transmit UCI to the radio base station 10 using a UL data channel (for example, PUSCH) or a UL control channel (for example, a short PUCCH and/or a long PUCCH).

Furthermore, the transmitting/receiving sections 203 may receive, through physical layer signaling (L1 signaling) and/or higher layer signaling, control information related to the UL control channel (for example, a short PUCCH, a long PUCCH) (for example, at least one of a format, the number of PUCCH units in a slot, a size of PUCCH unit, a multiplexing method of RS, a mapping position of RS, the presence or absence of RS, RS density, the presence or absence of SRS, a resource for UL control channel).

Furthermore, the transmitting/receiving sections 203 may receive information related to fallback (for example, the above-described command information and/or configuration information).

The transmitting/receiving sections 203 may be transmitters/receivers, transmitting/receiving circuits, or pieces of transmitting/receiving apparatus that can be described based on general understanding of the technical field to which the present invention pertains. In addition, each transmitting/receiving section 203 may be structured as a transmitting/receiving section in one entity, or may be constituted with a transmitting section and a receiving section.

Figure 11:
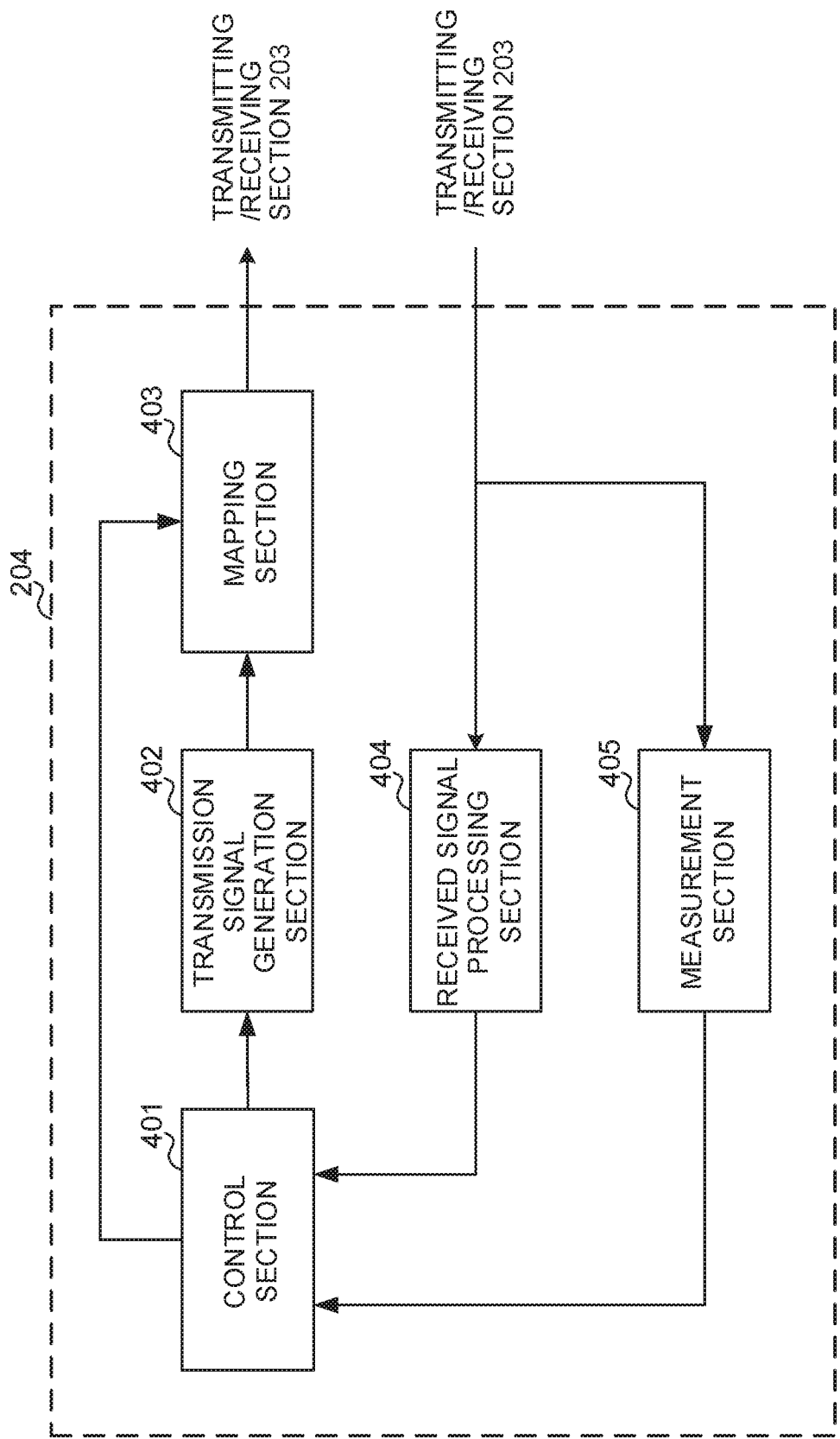
FIG. 11 is a diagram to show an example of a functional structure of a user terminal according to the present embodiment.

FIG. 11 is a diagram to show an example of a functional structure of a user terminal according to the present embodiment. Note that, although FIG. 11 primarily shows functional blocks that pertain to characteristic parts of the present embodiment, the user terminal 20 includes other functional blocks that are necessary for radio communication as well. As shown in FIG. 11, the baseband signal processing section 204 included in the user terminal 20 is provided with a control section 401, a transmission signal generation section 402, a mapping section 403, a received signal processing section 404, and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405, and so on.

Furthermore, the control section 401 controls a UL control channel used for transmission of UCI from the user terminal 20, based on an explicit command from the radio base station 10 or an implicit determination in the user terminal 20.

Furthermore, the control section 401 may control a structure (format) of a UL control channel (for example, a long PUCCH and/or a short PUCCH). The control section 401 may control the format of the UL control channel, based on the control information from the radio base station 10.

Furthermore, the control section 401 may control a PUCCH format (a format of an uplink control channel) to be used for transmission of the UCI, based on information related to fallback.

Specifically, the control section 401 may determine a PUCCH format in accordance with a predetermined rule (first aspect).

Furthermore, based on information indicating a PUCCH format, or based on information indicating a short PUCCH (an uplink control channel of a first duration) or a long PUCCH (an uplink control channel of a second duration) and/or the number of bits that can be transmitted by a PUCCH format, the control section 401 may determine a PUCCH format (second aspect).

Furthermore, based on the number of bits that can be transmitted by the PUCCH format, and a type and/or the number of bits of UCI, the control section 401 may control selection and/or drop of at least part of the UCI (first and second aspects).

Furthermore, the control section 401 may determine PUCCH resources to be used in a PUCCH format, based on higher layer signaling and/or downlink control information (third aspect).

The control section 401 may control at least one of the transmission signal generation section 402, the mapping section 403, and the transmitting/receiving sections 203 to perform a transmission process of UCI, based on the PUCCH format.

The control section 401 can be constituted with a controller, a control circuit, or control apparatus that can be described based on general understanding of the technical field to which the present invention pertains.

The transmission signal generation section 402 generates (for example, through coding, rate matching, puncturing, modulation, and so on) UL signals (including UL data signals, UL control signals, UL reference signals, and UCI), based on commands from the control section 401 and outputs these signals to the mapping section 403. The transmission signal generation section 402 may be a signal generator, a signal generation circuit, or signal generation apparatus that can be described based on general understanding of the technical field to which the present invention pertains.

The mapping section 403 maps the UL signals generated in the transmission signal generation section 402 to radio resources, based on commands from the control section 401, and outputs these to the transmitting/receiving sections 203. The mapping section 403 may be a mapper, a mapping circuit, or mapping apparatus that can be described based on general understanding of the technical field to which the present invention pertains.

The received signal processing section 404 performs a receiving process (for example, demapping, demodulation, decoding, and so on) on DL signals (DL data signals, scheduling information, DL control signals, and DL reference signals). The received signal processing section 404 outputs information received from the radio base station 10, to the control section 401. The received signal processing section 404 outputs, for example, broadcast information, system information, higher layer control information through higher layer signaling such as RRC signaling, physical layer control information (L1/L2 control information), and so on, to the control section 401.

The received signal processing section 404 can be constituted with a signal processor, a signal processing circuit, or signal processing apparatus that can be described based on general understanding of the technical field to which the present invention pertains. Also, the received signal processing section 404 can constitute a receiving section according to the present invention.

The measurement section 405 measures channel states, based on reference signals (for example, CSI-RSs) from the radio base station 10, and outputs the measurement results to the control section 401. Note that the channel state measurements may be conducted per CC.

The measurement section 405 can be constituted with a signal processor, a signal processing circuit, or signal processing apparatus, and a measurer, a measurement circuit, or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 12:
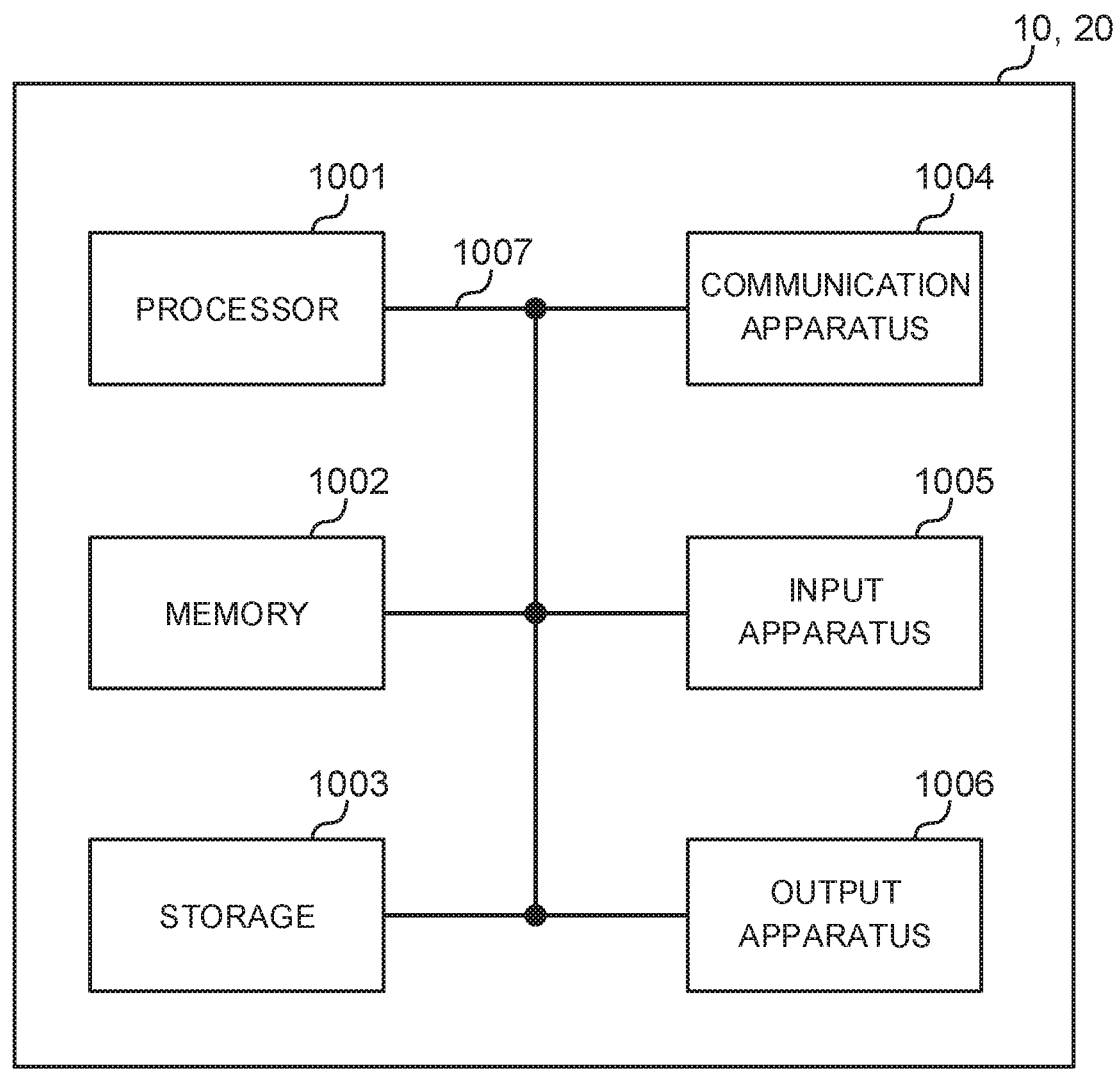
FIG. 12 is a diagram to show an example of a hardware structure of a radio base station and a user terminal according to the present embodiment.

For example, a radio base station, a user terminal, and so on according to one embodiment of the present invention may function as a computer that executes the processes of the radio communication method of the present invention. FIG. 12 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein may be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "transmission reception point," "femto cell," "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

A base station and/or mobile station may be also referred to as "transmission apparatus," "reception apparatus," and so on.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise.

For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal comprising:
    a receiver that receives information related to fallback of an uplink control channel;
    a processor that controls a format of the uplink control channel used for transmission of uplink control information (UCI) based on the information related to the fallback; and
    a transmitter that transmits the UCI based on the format of the uplink control channel by using at least one of an uplink control channel of a first duration over a first number of symbols and an uplink control channel of a second duration over a second number of symbols, wherein the second duration is longer than the first duration,
    wherein, when the processor performs fallback to the format of the uplink control channel of the first duration and when the UCI to be transmitted includes HARQ-ACK of up to 2 bits, the transmitter transmits the HARQ-ACK by the format of the uplink control channel of the first duration, and the transmitter does not transmit channel state information (CSI).

2. A radio communication method for a terminal, comprising:
    receiving information related to fallback of an uplink control channel;
    controlling a format of the uplink control channel used for transmission of uplink control information (UCI) based on the information related to the fallback; and
    transmitting the UCI based on the format of the uplink control channel by using at least one of an uplink control channel of a first duration over a first number of symbols and an uplink control channel of a second duration over a second number of symbols, wherein the second duration is longer than the first duration,
    wherein, when the terminal performs fallback to the format of the uplink control channel of the first duration and when the UCI to be transmitted includes HARQ-ACK of up to 2 bits, the terminal transmits the HARQ-ACK by the format of the uplink control channel of the first duration, and the terminal does not transmit channel state information (CSI).

3. A base station comprising:
    a transmitter that transmits information related to fallback of an uplink control channel; and a receiver that receives uplink control information (UCI) based on a format of the uplink control channel by using at least one of an uplink control channel of a first duration over a first number of symbols and an uplink control channel of a second duration over a second number of symbols, wherein the second duration is longer than the first duration, wherein the format of the uplink control channel used for transmission of the UCI is controlled based on the information related to the fallback, and wherein, when a terminal performs fallback to the format of the uplink control channel of the first duration and when the UCI to be transmitted includes HARQ-ACK of up to 2 bits, the receiver receives the HARQ-ACK by the format of the uplink control channel of the first duration, and the receiver does not receive channel state information (CSI).

4. A system comprising a terminal and a base station, wherein the base station comprises:
  a first transmitter that transmits information related to fallback of an uplink control channel, and the terminal comprises:
  a receiver that receives the information related to fallback of the uplink control channel;
  a processor that controls a format of the uplink control channel used for transmission of uplink control information (UCI) based on the information related to the fallback; and
  a second transmitter that transmits the UCI based on the format of the uplink control channel by using at least one of an uplink control channel of a first duration over a first number of symbols and an uplink control channel of a second duration over a second number of symbols, wherein the second duration is longer than the first duration, wherein, when the processor performs fallback to the format of the uplink control channel of the first duration and when the UCI to be transmitted includes HARQ-ACK of up to 2 bits, the second transmitter transmits the HARQ-ACK by the format of the uplink control channel of the first duration, and the second transmitter does not transmit channel state information (CSI).

* * * * *